United States Patent
Ryan

(10) Patent No.: US 10,011,413 B1
(45) Date of Patent: Jul. 3, 2018

(54) DRINKING STRAW WRAPPER HAVING SEPARABLE AND EASILY REPLACEABLE UPPER PORTION PROVIDING REUSABLE STRAW TOP COVER

(71) Applicant: Janet A. Ryan, Locust Valley, NY (US)

(72) Inventor: Janet A. Ryan, Locust Valley, NY (US)

( * ) Notice: Subject to any disclaimer, the term of this patent is extended or adjusted under 35 U.S.C. 154(b) by 0 days.

(21) Appl. No.: 15/145,401

(22) Filed: May 3, 2016

Related U.S. Application Data

(60) Provisional application No. 62/156,576, filed on May 4, 2015.

(51) Int. Cl.
| | | |
|---|---|---|
| *B65D 65/00* | (2006.01) | |
| *B65D 75/58* | (2006.01) | |
| *B65D 65/02* | (2006.01) | |
| *B65D 85/08* | (2006.01) | |

(52) U.S. Cl.
CPC ......... *B65D 75/5827* (2013.01); *B65D 65/02* (2013.01); *B65D 85/08* (2013.01)

(58) Field of Classification Search
CPC .... B65D 75/5827; B65D 65/02; B65D 85/08; B65D 2517/0049; A47G 19/2222; A47G 21/18
USPC ................ 229/87.01, 103.1, 87.05; 220/705; 239/33, 24; 53/461, 133.6; 426/85, 106; 215/388; D7/300.2, 391
See application file for complete search history.

(56) References Cited

U.S. PATENT DOCUMENTS

| | | | |
|---|---|---|---|
| 2,319,448 A | | 5/1943 | Frostad |
| 3,062,551 A | | 11/1962 | Malia |
| 5,054,264 A | | 10/1991 | Miller |
| 6,321,510 B2 | * | 11/2001 | Preisner ................. B65B 19/34 53/409 |
| D655,560 S | * | 3/2012 | Stone ........................... D19/155 |
| D676,269 S | | 2/2013 | Saprissa |
| 8,889,204 B1 | * | 11/2014 | Conroy ................ A47G 21/181 383/104 |
| D723,682 S | | 3/2015 | Landrum et al. |
| 2008/0256804 A1 | | 10/2008 | DeVries |

(Continued)

FOREIGN PATENT DOCUMENTS

CN 2096291 U 2/1992

*Primary Examiner* — Christopher Demeree
(74) *Attorney, Agent, or Firm* — Ryan, Mason & Lewis, LLP

(57) ABSTRACT

A drinking straw wrapper comprises an upper portion and a lower portion detachably engaged with the upper portion. The upper and lower portions are collectively configured to enclose a drinking straw. Detachment of the upper portion from the lower portion creates an opening in the upper portion and an opening in the lower portion, with the opening in the upper portion being substantially wider than the opening in the lower portion so as to facilitate replacement of the upper portion on a top of the straw after its initial removal therefrom. The upper portion may be formed from a first material and the lower portion formed from a second material different than the first material. Alternatively, the upper portion may be formed from a material having a first thickness and the lower portion formed from a same material but having a second thickness that is less than the first thickness.

20 Claims, 6 Drawing Sheets

(56) References Cited

U.S. PATENT DOCUMENTS

2012/0067909 A1\* 3/2012 Mattheus ............... A47G 21/18
                                                    220/705
2012/0236679 A1   9/2012 Oilveira
2012/0261292 A1\* 10/2012 Lieb ..................... B65D 75/02
                                                    206/457

\* cited by examiner

DRINKING STRAW WRAPPER HAVING SEPARABLE AND EASILY REPLACEABLE UPPER PORTION PROVIDING REUSABLE STRAW TOP COVER

FIELD

The field relates generally to drinking straws, and more particularly to wrappers for drinking straws.

BACKGROUND

A wide variety of different drinking straw covers and other types of drinking straw wrappers are known in the art. A typical conventional arrangement is described in U.S. Pat. No. 5,054,264, issued Oct. 8, 1991 and entitled "Easy Tear Straw Cover." This drinking straw cover includes a line of circumferential indentations that separate the straw cover into an upper proximal portion and a remaining distal portion. The circumferential indentations are configured to facilitate separation of the straw cover into its upper proximal and remaining distal portions when the straw cover is opened by a user pulling it apart along its longitudinal axis.

SUMMARY

I have found that conventional drinking straw wrappers such as that described in the above-cited U.S. Pat. No. 5,054,264 are problematic. For example, after the straw cover in this conventional arrangement is separated into its upper proximal and remaining distal portions by a user opening the straw cover, it will be particularly difficult for the user, upon fully removing the upper proximal portion so as to utilize the straw for drinking, to thereafter replace the upper proximal portion back on the straw.

Other conventional drinking straw wrappers exhibit similar problems. For example, it is not uncommon in bars and restaurants for a server to remove a lower portion of a standard drinking straw wrapper and to insert the exposed part of the drinking straw into a beverage container before delivering the beverage container to a user, with the upper portion of the drinking straw wrapper remaining on the straw. The user receiving the beverage container from the server removes the upper portion of the drinking straw wrapper and proceeds to sip the beverage through the straw. However, the user in many scenarios may wish to once again replace the upper portion of the drinking straw wrapper back on the straw. For example, the user may wish to set the beverage aside for a time, or to carry the beverage to another location, and does not want airborne particulates or other contaminants to enter his or her beverage through the exposed top of the straw. Moreover, it is possible for other users to make undesirable physical contact with the exposed top of the straw, thereby introducing additional contaminants, or for bees or other insects to attempt to enter the exposed top of the straw, particularly at the beach, pool or barbecue during summer months.

In these and other scenarios, it is difficult for the user to replace the upper portion of the drinking straw wrapper back on the straw, because the circumference of the wrapper is typically just slightly larger than the circumference of the straw. This replacement difficulty can be particularly severe in the case of drinking straw wrappers made of paper or plastic, as the opening in the upper portion may not maintain its shape after removal from the straw, perhaps due to exposure to liquid. Accordingly, in many cases, the user simply discards the upper portion of the straw wrapper after first removing it from the straw, and suffers with the above-described problems associated with lack of any covering for the top of the straw.

Illustrative embodiments of the present invention address these and other problems of conventional practice by providing a drinking straw wrapper with separable upper and lower portions with the upper portion being configured to facilitate repeated easy removal and replacement on the top of the drinking straw.

In one embodiment, a drinking straw wrapper comprises an upper portion and a lower portion detachably engaged with the upper portion. The upper and lower portions are collectively configured to enclose a drinking straw. Detachment of the upper portion from the lower portion creates an opening in the upper portion and an opening in the lower portion, with the opening in the upper portion being substantially wider than the opening in the lower portion so as to facilitate replacement of the upper portion on a top of the straw after its initial removal therefrom.

By way of example, the upper portion may be formed from a first material and the lower portion formed from a second material different than the first material.

As another example, the upper portion may be formed from a material having a first thickness and the lower portion formed from a same material but having a second thickness that is less than the first thickness.

Other embodiments include without limitation wrapped items comprising drinking straws and methods of utilizing wrapped drinking straws.

One or more of the illustrative embodiments allow a user to easily replace the upper portion of a drinking straw wrapper on the top of the straw, thereby providing the benefit of a reusable straw top cover in an integrated wrapper.

DETAILED DESCRIPTION

Embodiments of the invention will be illustrated herein in conjunction with exemplary drinking straw wrappers having separable upper and lower portions with the upper portion being configured for easy removal and replacement on the top of the drinking straw. It should be understood, however, that embodiments of the invention are more generally applicable to a wide variety of other drinking straw wrapper arrangements. The term "drinking straw wrapper" as used herein is therefore intended to be broadly construed.

Figure 1:
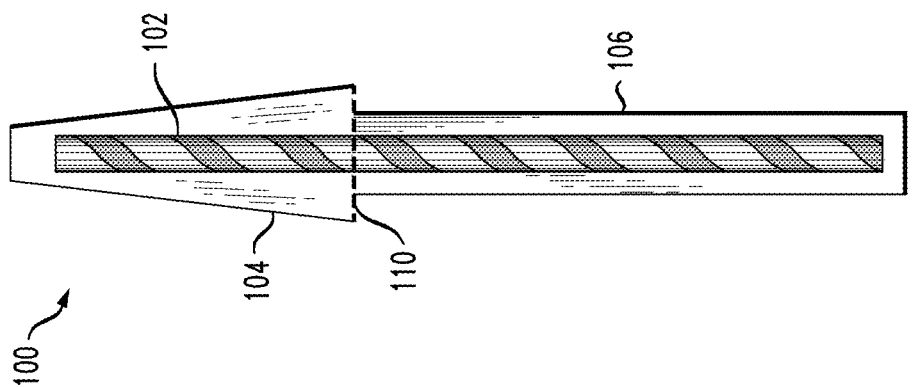

FIG. 1 shows a wrapped drinking straw 100 in a first illustrative embodiment. The wrapped drinking straw 100 comprises a drinking straw 102 and a drinking straw wrapper enclosing the drinking straw 102. The drinking straw wrapper comprises an upper portion 104 and a lower portion 106 detachably engaged with the upper portion 104 at a joining interface 110. The upper and lower portions 104 and 106 are collectively configured to enclose the drinking straw 102. Moreover, detachment of the upper portion 104 from the lower portion 106 in conjunction with opening of the drinking straw wrapper to expose at least part of the drinking straw 102 creates an opening in the upper portion 104 and an opening in the lower portion 106. The opening in the upper portion 104 is substantially wider than the opening in the lower portion 106 so as to facilitate replacement of the upper portion on the top of the straw 102 after its initial removal from the top of the straw 102.

In the wrapped drinking straw 100 as illustrated in FIG. 1, it is assumed that the drinking straw wrapper is made of a transparent material such as plastic, and accordingly the straw 102 is visible through the wrapper. Similar assumptions are made in the context of the illustrative embodiments of FIGS. 2, 3 and 4. However, in other embodiments, other types of materials can be used to construct the wrapper, including paper and other opaque materials through which the wrapped straw would not be visible.

In some embodiments, the upper portion 104 is formed from a first material and the lower portion 106 is formed from a second material different than the first material. For example, the upper portion 104 can be formed of plastic and the lower portion 106 can be formed of paper. As another example, the upper portion 104 can be formed of cardboard and the lower portion 106 can be formed of paper or plastic. Such arrangements generally ensure that the upper portion 104 is more sturdy than the lower portion 106 and the additional sturdiness in combination with the wider opening help to make the upper portion 104 an effective easily replaceable and reusable top for the drinking straw after separation of the upper portion 104 from the lower portion 106 at the joining interface 110.

It is also possible in some embodiments for the upper portion 104 and the lower portion 106 to be formed of the same material, but with different thicknesses of that material being used in the different portions. For example, thicker paper may be used to form the upper portion 104 and thinner paper may be used to form the lower portion 106. Other arrangements of different thicknesses of the same material can be used to form the upper and lower portions. This is again with the goal of increasing the sturdiness of the upper portion 104 relative to the lower portion 106, as the upper portion is intended for repeated use as a replaceable top for the drinking straw 102 while the lower portion will typically be discarded upon the initial opening of the wrapper to expose at least part of the straw.

In the FIG. 1 embodiment, the upper portion 104 of the drinking straw wrapper has a substantially trapezoidal cross-section in a plane that includes a longitudinal axis of the drinking straw 102, while the lower portion 106 has a rectangular cross-section in that same plane. Upon separation from the lower portion 106 at the joining interface 110, the upper portion 104 has a wider opening that the corresponding opening of the lower portion 106. The joining interface 110 in this embodiment illustratively defines at least part of each of the openings in the upper and lower portions, with the opening in the upper portion being substantially wider than the opening in the lower portion as previously indicated.

A wide variety of different joining mechanisms may be used to detachably connect the upper portion 104 to the lower portion 106 at the joining interface 110. For example, various types of serrations may be used that facilitate detachment of the two portions from one another along the joining interface 110. As another example, the upper portion 104 may be joined to the lower portion 106 via a breakable seal.

Figure 2:
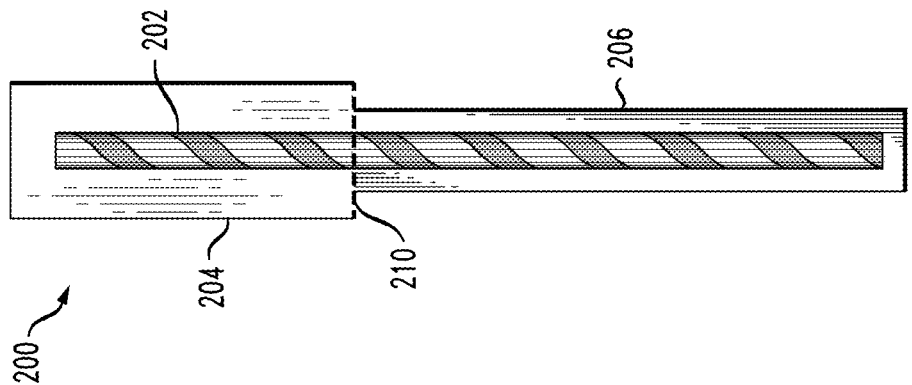
FIGS. 1 through 4 show drinking straw wrappers in accordance with respective illustrative embodiments.

FIG. 2 shows another illustrative embodiment of a wrapped drinking straw 200. The wrapped drinking straw 200 in this embodiment comprises a drinking straw 202 and a drinking straw wrapper enclosing the drinking straw 202. The drinking straw wrapper comprises an upper portion 204 and a lower portion 206 detachably engaged with the upper portion 204 at a joining interface 210. The upper and lower portions 204 and 206 are collectively configured to enclose the drinking straw 202. As in the FIG. 1 embodiment, detachment of the upper portion 204 from the lower portion 206 in conjunction with opening of the drinking straw wrapper to expose at least part of the drinking straw 202 creates an opening in the upper portion 204 and an opening in the lower portion 206. The opening in the upper portion 204 is substantially wider than the opening in the lower portion 206 so as to facilitate replacement of the upper portion on the top of the straw 202 after its initial removal from the top of the straw 202.

In the FIG. 2 embodiment, the upper portion 204 has a rectangular cross-section in a plane that includes a longitudinal axis of the drinking straw and the lower portion 206 also has a rectangular cross-section in that plane. However, the rectangular cross-section of the upper portion 204 has both a length and a width that are different than the corresponding length and width of the rectangular cross-section of the lower portion 206.

Numerous other shapes are possible for upper and lower portions of a drinking straw wrapper in other embodiments. For example, with reference to the embodiment of FIG. 3, a wrapped drinking straw 300 comprises a drinking straw wrapper configured to enclose a drinking straw 302. The drinking straw wrapper includes upper and lower portions 304 and 306 that are detachably engaged with one another at a joining interface 310. In this embodiment, the upper portion 204 has a first type of cross-section shape in a plane that includes a longitudinal axis of the drinking straw and the lower portion 206 also has a second type of cross-sectional shape in that plane, with the first and second cross-sectional shapes being complementary to one another at the joining interface 310 and also having different corresponding width and length dimensions relative to one another.

Figure 3:
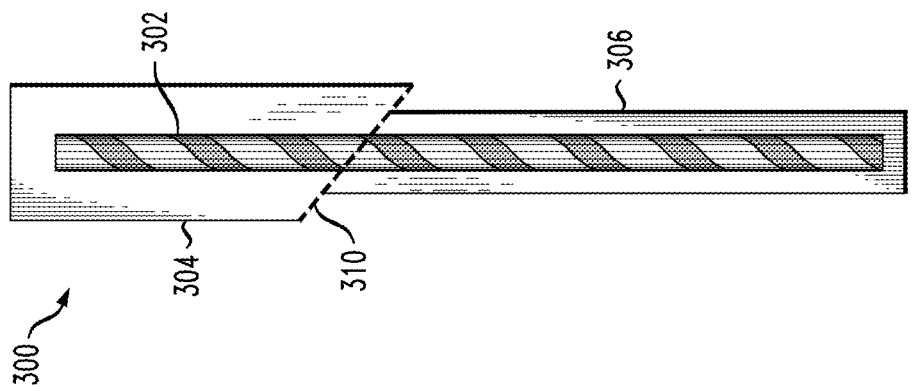

The FIG. 3 embodiment may be viewed as an example of an arrangement in which the upper portion 304 is joined to the lower portion 306 via a serration that is in an angled plane relative to a longitudinal axis of the drinking straw 302. Other types of angled plane serrations may be used to detachably engage upper and lower portions of a drinking straw wrapper in other embodiments.

Figure 4:
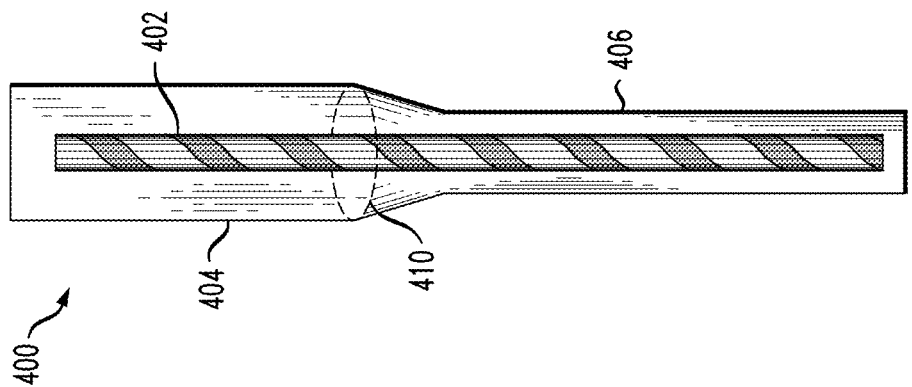

A further embodiment is shown in FIG. 4. In this embodiment, a wrapped drinking straw 400 comprises a drinking straw wrapper configured to enclose a drinking straw 402. The drinking straw wrapper includes upper and lower portions 404 and 406 that are detachably engaged with one another at a joining interface 410. The upper and lower portions 404 and 406 are illustratively configured with respective cylindrical shapes, with the circumference of most of the upper portion 404 being greater than the corresponding dimension of most of the lower portion 406. However, near the joining interface, the cylindrical shapes of the upper and lower portions are tapered towards one another, with the cylindrical shape of the upper portion being tapered inward toward the lower portion and the cylindrical shape of the lower portion being tapered outward toward the upper portion.

The two portions 404 and 406 come together at the joining interface 110 via a serration that is in an angled plane relative to the longitudinal axis of the drinking straw 402. The serration in this embodiment is configured such that the part of the upper portion behind the straw 402 in the figure is lower than the part of the upper portion in front of the straw 402. This facilitates the replacement of the upper portion 404 on the top of the straw 402 after the upper and lower portions are detached from one another.

In the FIG. 4 embodiment, the widths of the upper and lower openings at the joining interface 410 are substantially the same, due to the inward tapering of the upper portion and the outward tapering of the lower portion, although in other implementations of the FIG. 4 embodiment or similar embodiments, the opening of the upper portion may alternatively be substantially larger than the opening of the lower portion after separation of the upper and lower portions, as in one or more other embodiments disclosed herein.

Embodiments of the invention having a substantially wider opening in the upper portion than in the lower portion can be configured in other manners as well. For example, such an arrangement can be achieved by having the top of the lower portion detachably engaged to the inner walls of the upper portion within the opening of the lower portion. It should be noted in this regard that the term "opening" as used herein generally refers to part of an upper portion or lower portion that is configured to receive an end of a straw. Accordingly, inner wall attachment mechanisms or other similar joining mechanisms in some embodiments do not necessarily constitute a part of an opening in an upper or lower portion for purposes of determining relative widths of the openings of the upper and lower portions.

The FIG. 4 embodiment may be viewed as an example of an arrangement in which the upper portion is joined to the lower portion via a serration that is configured to define the opening in the upper portion relative to the opening in the lower portion responsive to detachment of the upper portion from the lower portion via the serration.

Figure 5:
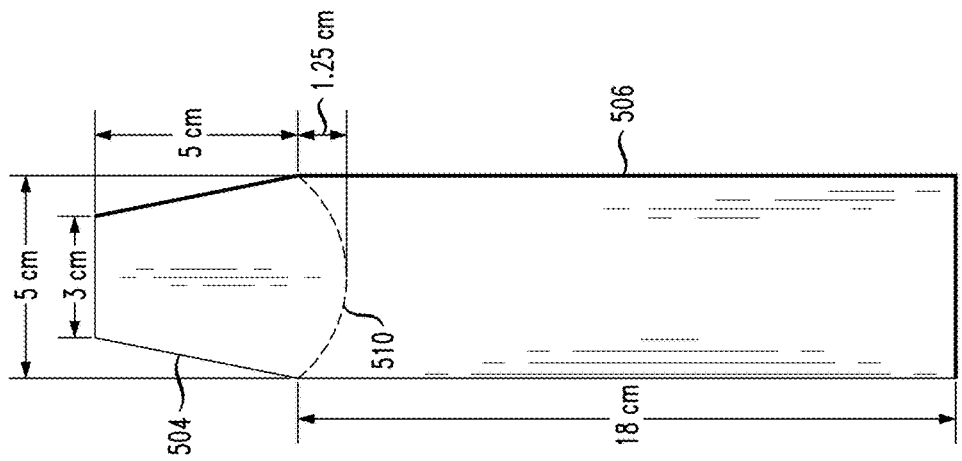
FIG. 5 shows an embodiment of a drinking straw wrapper prior to folding to enclose a drinking straw.

Another embodiment of this type is illustrated in FIG. 5, which shows a drinking straw wrapper 500 prior to folding of the wrapper to enclose a drinking straw. There is no drinking straw shown in this figure. The drinking straw wrapper includes an upper portion 504 detachably engaged with a lower portion 506 at a joining interface 510, illustratively via a curvilinear serration that is shown in the figure as being within a plane of the flat wrapper prior to folding. In this embodiment, the flat wrapper is folded around a drinking straw and sealed at peripheral edges thereof in order to enclose the drinking straw. This folding and sealing of the wrapper 500 causes the serration of the joining interface 510 to fall within an angled plan relative to the longitudinal axis of the drinking straw. Example dimensions for portions of the drinking straw wrapper 500 are shown in the figure, but it is to be appreciated that alternative dimensions and shapes can be used in other embodiments.

Figure 6:
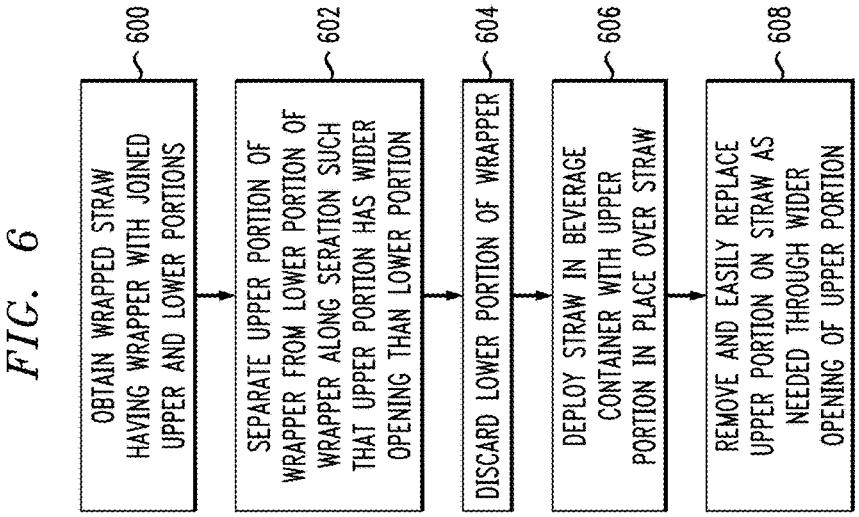
FIG. 6 is a flow diagram showing one possible set of steps for utilizing a wrapped drinking straw in an illustrative embodiment.

Wrapped drinking straws of the type described in conjunction with FIGS. 1 through 5 above can be utilized in accordance with the example process shown in FIG. 6. This process includes steps 600 through 608, which are illustratively performed by one or more users. It is assumed for purposes of simplifying the description below that the steps of the FIG. 6 process are performed by a single user, although in other embodiments different ones of the steps can be performed, for example, by two users corresponding respectively to a server and a recipient of a beverage in which a drinking straw is deployed with the upper portion of the straw wrapper remaining on the top of the straw.

In step 600, a user obtains a wrapped drinking straw having a wrapper with joined upper and lower portions. The joined upper and lower portions of the wrapper are collectively configured to enclose the drinking straw.

In step 602, the user separates the upper portion of the wrapper from the lower portion of wrapper along a serration such that upper portion has a wider opening than the lower portion. This detachment of the upper portion of the wrapper from the lower portion of the wrapper exposes at least part of the straw. Detachment of the upper portion from the lower portion creates the opening in the upper portion and the opening in the lower portion. The opening in the upper portion is substantially wider than the opening in the lower portion so as to facilitate replacement of the upper portion on a top of the straw after its initial removal therefrom.

In step 604, the user discards the lower portion of the wrapper. As noted above, the lower portion of the wrapper can be formed of relatively thin paper or plastic, with the upper portion being formed of a sturdier version of the same material or a sturdier different type of material, as the upper portion is intended for repeated use as a straw top cover while the lower portion is simply discarded as indicated in this step.

In step 606, the user deploys the straw in a beverage container with the upper portion remaining in place over the top of the straw.

In step 608, the user removes the upper portion and then subsequently easily replaces the upper portion on the straw as needed through the wider opening of the upper portion. This illustratively involves the user removing the upper portion from the top of the straw, replacing the upper portion on the top of the straw, and repeating the removing and replacing one or more additional times as needed.

For example, assume that a user Anne has a smoothie in a disposable plastic cup with a fitted plastic top. Anne obtains a wrapped straw and opens the wrapped straw by separating the upper and lower portions of the wrapper at their joining interface. The lower portion of the wrapper is discarded. The corresponding exposed lower part of the straw is inserted into the plastic top of the cup for use. Anne removes the upper portion of the wrapper from the top of the straw and takes a few sips of her smoothie with the straw. She then decides to place her drink in the refrigerator for a short time. Anne takes the upper portion of the wrapper and replaces it back on the top of the straw. The upper portion of the wrapper serves as a cover for the top of the straw and protects the top of the straw and the smoothie itself from the introduction of contaminants. When Anne returns to the fridge to finish her drink she can confidently remove the upper portion of the wrapper and reuse her protected straw.

In the FIG. 6 embodiment and other embodiments herein, the replaceable upper portion serves to protect the top of the straw and the associated beverage from the introduction of contaminants. Accordingly, when the straw wrapper is first opened by separating the upper and lower portions, the lower portion is discarded but the upper portion is saved for future use as a replaceable cover for the top of the straw. The upper portion is shaped so as to facilitate such repeated replacement on the top of the straw by providing it with a substantially wider opening than that of the lower portion, and additionally or alternatively utilizing different material thicknesses or types to ensure that the upper portion is sufficiently sturdy to retain its shape even when exposed to liquids. This is unlike conventional straw wrappers for which it is usually very difficult to replace a portion of the wrapper on the top of the straw, and for which the wrapper can lose its shape or even disintegrate in the presence of liquids.

It is to be appreciated that the particular steps shown in FIG. 6 and described above are examples only, and should not be construed as limiting in any way.

In some embodiments, the upper portion of a drinking straw wrapper has a conical shape and the lower portion has a cylindrical shape. An example of an arrangement of this type results from the folding and sealing of the unfolded wrapper of FIG. 5 to enclose a drinking straw.

Figure 8:
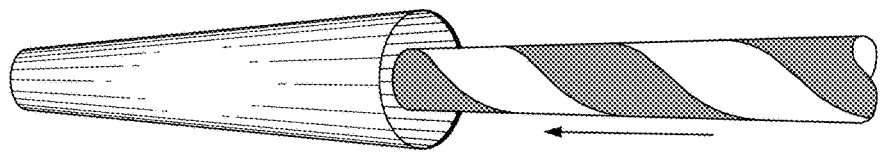
FIGS. 7, 8 and 9 illustrate replacement of an upper portion of the drinking straw wrapper on the top of a drinking straw in one embodiment.
Figure 7:
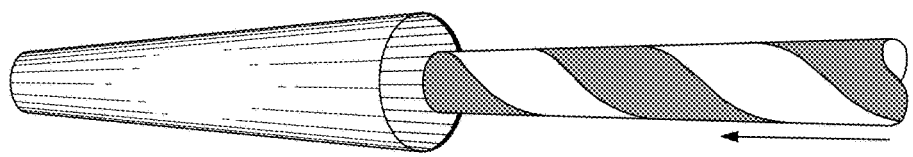
Figure 9:
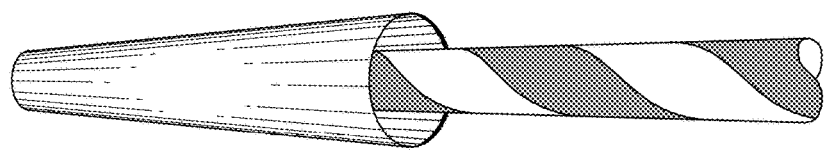

The gradual replacement of an upper portion of the drinking straw wrapper on the top of a drinking straw in one embodiment is illustrated in the series of photographs shown in FIGS. 7, 8 and 9. This is a type of arrangement in which the upper portion of the wrapper, having been previously disengaged from the lower portion and removed from the top of the straw, is subsequently replaced on the top of the straw. The upper portion in this particular arrangement has a generally conical shape and is assumed to have a flat sealed top although the top is not illustrated in these drawings.

Figure 10:
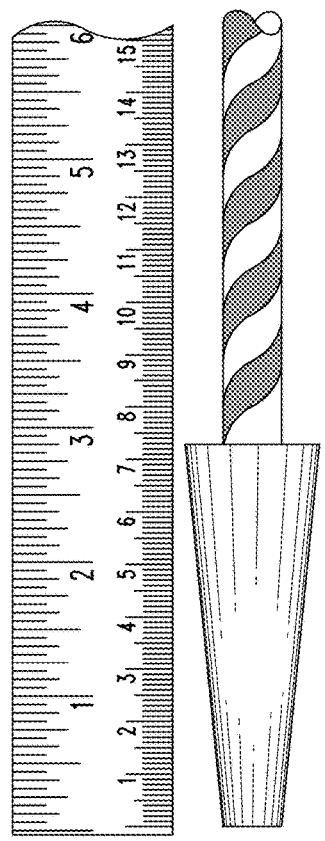
FIG. 10 illustrates example dimensions of the upper portion of the drinking straw wrapper utilized in the embodiment of FIGS. 7-9.

FIG. 10 shows exemplary dimensions of the upper portion by comparison with a ruler, although it should be understood that different dimensions can be used in other embodiments.

Figure 11:
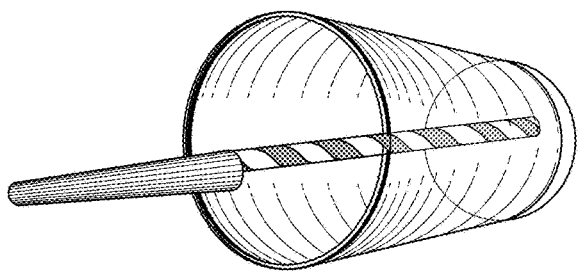
FIG. 11 illustrates the upper portion of the drinking straw wrapper of FIG. 10 deployed on the top of the drinking straw in a beverage container.

FIG. 11 illustrates the upper portion of the drinking straw wrapper of FIGS. 7-10 deployed on the top of the drinking straw in a beverage container. It can be seen that the opening of the upper portion of the drinking straw wrapper is sufficiently wide to facilitate easy replacement on the top of the straw. For example, in this embodiment, the circumference of the opening of the lower portion is approximately two to three times the circumference of the straw. The opening of the upper portion that accepts the top of the straw as illustrated is therefore not only substantially wider than the corresponding opening in the lower portion of the wrapper, but is a multiple of at least about two times or more greater in width than the straw itself, where such relative width can be measured, for example, by use of circumference or diameter in the case of a circular opening. Such an arrangement makes it easy for the user to repeatedly remove and replace the upper portion on the top of the straw.

Figure 12:
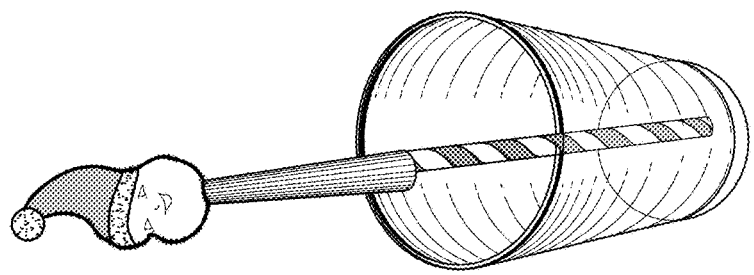
FIG. 12 shows another embodiment in which an upper portion of a drinking straw wrapper includes a design element that may be utilized to facilitate identification of a particular user beverage from among a set of similar beverages.

In some embodiments, the upper portion of the straw wrapper can be configured to include a visual design element that helps to uniquely identify the corresponding straw as being associated with a particular user when the straw is deployed in a beverage container. Such a visual design element can be selected to distinguish a particular instance of the drinking straw wrapper from other instances of the drinking straw wrapper having respective different visual design elements. An embodiment that utilizes such a design element is shown in FIG. 12. In this embodiment, the upper portion of the drinking straw wrapper comprises a distinct visual design element in the form of an easy-to-remember image that may be utilized to facilitate identification of a particular user beverage from among a set of similar beverages.

For example, assume that Bob, Claire, Dan and Elizabeth are at a party and that all four of them are drinking the same type of drink from exactly the same type of cup. Further assume that distinct instances of the wrapped straws have been distributed to each of these users. The distinct instances can include different colors, images or other distinguishing features that serve to differentiate one instance of the straw wrapper from another. Bob needs to run off to make a phone call but before leaving replaces the upper portion of his straw wrapper on the top of his straw. When he returns to the party he can easily determine which of the otherwise indistinguishable drinks belongs to him. The distinct design elements can be configured in accordance with a distinct party theme. Packages of wrapped drinking straws can be arranged for sale to include a significant number of such distinct instances of the wrapped drinking straw so as to facilitate identification of beverages.

The embodiments of FIGS. 7-12 are examples of arrangements in which the upper portion of a drinking straw wrapper has a generally conical shape. In another conical shape variant, the top of the upper portion can be the point of a cone rather than a flat sealed top as is assumed for the upper portion in the arrangements illustrated in FIGS. 7-12.

It should be noted that the above-described drinking straw wrapper arrangements are exemplary only, and alternative arrangements can be used in other embodiments. For example, various alternative materials, shapes, joining mechanisms and configurations can be used in forming the upper and lower portions of a given drinking straw wrapper.

The illustrative embodiments described above can provide considerable advantages over conventional arrangements. For example, such embodiments eliminate the difficulties associated with replacing an upper portion of a straw wrapper back onto the top of a drinking straw after its initial removal therefrom, by providing a drinking straw wrapper with separable upper and lower portions with the upper portion being configured to facilitate repeated easy removal and replacement on the top of the straw. This is achieved in some embodiments by sizing an opening of the upper portion to be substantially larger than a corresponding opening in the lower portion, and additionally or alternatively by forming the upper portion using thicker or otherwise sturdier material than that used to form the lower portion.

One or more of the illustrative embodiments allow a user to easily replace the upper portion of a drinking straw wrapper on the top of the straw, thereby providing the benefit of a reusable straw top cover in an integrated wrapper.

In addition, embodiments of the invention can potentially reduce the number of individually packaged straws that are used by avoiding the need to discard and replace straws that may have become contaminated due to lack of an appropriate cover for the top of the straw. The easily replaceable upper portion in some embodiments acts as a barrier against dust, debris or other contaminants that might otherwise come into contact with the top of the straw or the associated beverage.

Furthermore, by incorporation of appropriate unique design elements that vary from instance to instance of the drinking straw wrapper, the beverage of one user can be easily distinguished from the beverages of other users through use of the distinct upper portions as respective covers for straws deployed in those beverages.

It should again be emphasized that the embodiments of the invention as described herein are intended to be illustrative only. Other embodiments can be implemented utilizing a wide variety of different types and arrangements of straws, wrappers, upper portions, lower portions, materials, joining mechanisms and other features and components than those utilized in the embodiments described herein. These and numerous other alternative embodiments will be readily apparent to those skilled in the art.

What is claimed is:

1. A drinking straw wrapper comprising:
an upper portion; and
a lower portion detachably engaged with the upper portion;
the upper and lower portions being collectively configured to enclose a drinking straw;
wherein detachment of the upper portion from the lower portion creates an opening in the upper portion and an opening in the lower portion;
wherein the opening in the upper portion is substantially wider in circumference than the opening in the lower portion and at least about two times wider in circumference than a cross-sectional circumference of the drinking straw so as to facilitate replacement of the upper portion on a top of the straw after its initial removal therefrom.

2. The wrapper of claim 1 wherein the upper portion is formed from a first material and the lower portion is formed from a second material different than the first material.

3. The wrapper of claim 1 wherein the upper portion is formed from a material having a first thickness and the lower portion is formed from a same material but having a second thickness that is less than the first thickness.

4. The wrapper of claim 1 wherein the upper portion has a trapezoidal cross-section in a plane that includes a longitudinal axis of the drinking straw and the lower portion has a rectangular cross-section in said plane.

5. The wrapper of claim 1 wherein the upper portion has a rectangular cross-section in a plane that includes a longitudinal axis of the drinking straw and the lower portion has a rectangular cross-section in said plane, with the rectangular cross-section of the upper portion having both a length and a width that are different than a length and a width of the rectangular cross-section of the lower portion.

6. The wrapper of claim 1 wherein the upper portion has a conical shape and the lower portion has a cylindrical shape.

7. The wrapper of claim 1 wherein the upper portion is joined to the lower portion via a serration that is in an angled plane relative to a longitudinal axis of the drinking straw.

8. The wrapper of claim 1 wherein the upper portion is joined to the lower portion via a serration that is configured to define the wider opening in the upper portion relative to the opening in the lower portion responsive to detachment of the upper portion from the lower portion via the serration.

9. The wrapper of claim 1 wherein the upper portion is joined to the lower portion via a breakable seal.

10. The wrapper of claim 1 wherein the upper portion includes a visual design element that is selected to distinguish the drinking straw wrapper from other instances of the drinking straw wrapper having respective different visual design elements.

11. A wrapped item comprising:
a drinking straw; and
a drinking straw wrapper enclosing the drinking straw;
the drinking straw wrapper comprising:
an upper portion; and
a lower portion detachably engaged with the upper portion;
the upper and lower portions being collectively configured to enclose a drinking straw;
wherein detachment of the upper portion from the lower portion creates an opening in the upper portion and an opening in the lower portion;
wherein the opening in the upper portion is substantially wider in circumference than the opening in the lower portion and at least about two times wider in circumference than a cross-sectional circumference of the drinking straw so as to facilitate replacement of the upper portion on a top of the straw after its initial removal therefrom.

12. The wrapped item of claim 11 wherein the upper portion is formed from a first material and the lower portion is formed from a second material different than the first material.

13. The wrapped item of claim 11 wherein the upper portion is formed from a material having a first thickness and the lower portion is formed from a same material but having a second thickness that is less than the first thickness.

14. The wrapped item of claim 11 wherein the upper portion has a trapezoidal cross-section in a plane that includes a longitudinal axis of the drinking straw and the lower portion has a rectangular cross-section in said plane.

15. The wrapped item of claim 11 wherein the upper portion has a rectangular cross-section in a plane that includes a longitudinal axis of the drinking straw and the lower portion has a rectangular cross-section in said plane, with the rectangular cross-section of the upper portion having both a length and a width that are different than a length and a width of the rectangular cross-section of the lower portion.

16. The wrapped item of claim 11 wherein the upper portion has a conical shape and the lower portion has a cylindrical shape.

17. The wrapped item of claim 11 wherein the upper portion is joined to the lower portion via a serration that is in an angled plane relative to a longitudinal axis of the drinking straw.

18. The wrapped item of claim 11 wherein the upper portion is joined to the lower portion via a serration that is configured to define the wider opening in the upper portion relative to the opening in the lower portion responsive to detachment of the upper portion from the lower portion via the serration.

19. A method comprising steps of:
obtaining a wrapped drinking straw having a wrapper having joined upper and lower portions collectively configured to enclose the drinking straw; and
detaching the upper portion of the wrapper from the lower portion of the wrapper to expose at least part of the straw;
wherein detachment of the upper portion from the lower portion creates an opening in the upper portion and an opening in the lower portion;
wherein the opening in the upper portion is substantially wider in circumference than the opening in the lower portion and at least about two times wider in circumference than a cross-sectional circumference of the drinking straw so as to facilitate replacement of the upper portion on a top of the straw after its initial removal therefrom.

20. The method of claim 19 further comprising:
deploying the straw in a beverage container with the upper portion in place over the top of the straw;
removing the upper portion from the top of the straw;
replacing the upper portion on the top of the straw; and
repeating the removing and replacing one or more additional times as needed.

* * * * *